United States Patent
Wipfler

(10) Patent No.: US 11,833,764 B2
(45) Date of Patent: Dec. 5, 2023

(54) ULTRASONIC TREATMENT METHOD

(71) Applicant: Herrmann Ultraschalltechnik Gmbh & Co. KG, Karlsbad (DE)

(72) Inventor: Thomas Wipfler, Ettlingen (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 13 days.

(21) Appl. No.: 17/760,810

(22) PCT Filed: Nov. 23, 2020

(86) PCT No.: PCT/EP2020/083101
§ 371 (c)(1),
(2) Date: Mar. 16, 2022

(87) PCT Pub. No.: WO2021/105068
PCT Pub. Date: Jun. 3, 2021

(65) Prior Publication Data
US 2022/0332054 A1    Oct. 20, 2022

(30) Foreign Application Priority Data
Nov. 29, 2019  (DE) ............. 10 2019 132 559.5

(51) Int. Cl.
*B29C 65/08*  (2006.01)
*B29C 65/00*  (2006.01)

(52) U.S. Cl.
CPC ........ *B29C 65/08* (2013.01); *B29C 66/83221* (2013.01); *B29C 66/9221* (2013.01); *B29C 66/92611* (2013.01)

(58) Field of Classification Search
CPC ............. B29C 65/08; B29C 66/83221; B29C 66/9221; B29C 66/92611
(Continued)

(56) References Cited

U.S. PATENT DOCUMENTS 3,022,814 A    2/1962  Bodine, Jr.
4,904,319 A    2/1990  Divincenzo et al.
(Continued)

FOREIGN PATENT DOCUMENTS

EP    0301831 A2    7/1988
EP    0421019 A1    4/1991
(Continued)

OTHER PUBLICATIONS

Jerome Carre, The International Bureau of the World Intellectual Property Organization, International Preliminary Report on Patentability, PCT/EP20201083101, dated Mar. 10, 2022 (English translation).

(Continued)

*Primary Examiner* — James D Sells
(74) *Attorney, Agent, or Firm* — PAUL & PAUL

(57) ABSTRACT

The present invention relates to a method for ultrasonic treatment of a plastic material, comprising the steps of: positioning the plastic material between a sonotrode and a counter-tool, bringing the sonotrode excited by means of an ultrasonic oscillation into contact with the plastic material during a welding phase, moving the sonotrode and the counter-tool towards each other during a holding phase, in which neither the sonotrode nor the counter-tool are excited with an ultrasonic oscillation so that a force F is applied onto the plastic material. In order to reduce treatment times, wherein at the same time the quality of the welding process is not impaired but is even to be improved, it is proposed according to the invention that the force F is varied during the holding phase.

9 Claims, 1 Drawing Sheet

(58) Field of Classification Search
USPC .......................................................... 156/73.1
See application file for complete search history.

(56) References Cited

U.S. PATENT DOCUMENTS 5,658,408 A * 8/1997 Frantz ..................... B29C 66/41
156/359
2018/0304543 A1 10/2018 Mayer et al.

FOREIGN PATENT DOCUMENTS

| EP | 2106899 | A2 | 10/2009 |
| EP | 2990182 | A2 | 2/2016 |
| JP | 2009297786 | A | 12/2009 |

OTHER PUBLICATIONS

Michaeli, W.; Korte, W.; Bessere Nahtqualitat beim Ultraschallschweissen—Kraftregelung mit Servoventil eroffnet neue Wege der Prozessfuhrung. In: Kunststoffe, Bd. 83, 1993, H. 9, S. 667-670-ISSN 0023-5563.

Carre, Jerome, The International Bureau of the World Intellectual Property Organization, International Preliminary Report on Patentability, PCT/EP2020/083101, dated Feb. 23, 2021 (English translation).

Office Action, dated Jul. 11, 2023, Japanese Patent Application No. 2022-531513 (and English translation).

\* cited by examiner

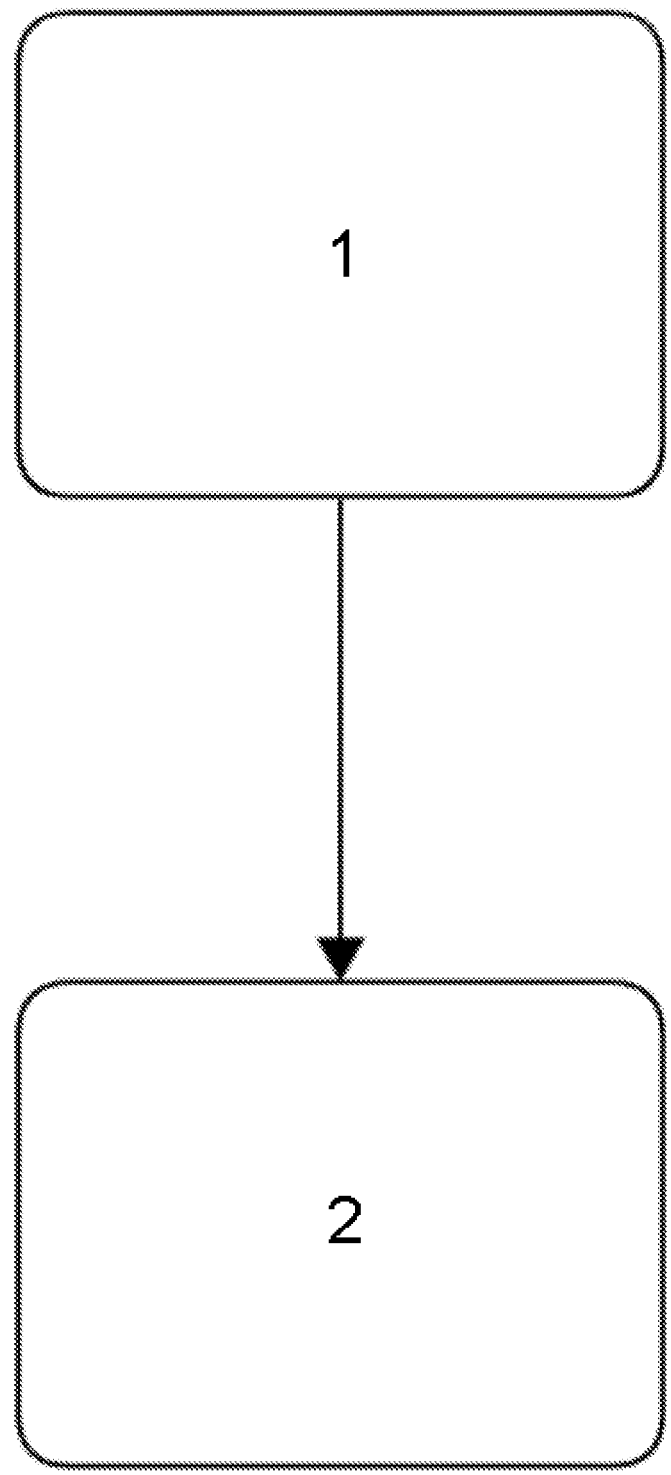

ULTRASONIC TREATMENT METHOD

CROSS-REFERENCE TO RELATED APPLICATIONS

This application is a national phase of International Application PCT/EP2020/083101 filed Nov. 23, 2020, and claims the priority of German Application No. 10 2019 132 559.5, filed on Nov. 29, 2019.

The present invention relates to a method for ultrasonic treatment of a plastic material comprising the steps:
A) positioning the plastic material between a sonotrode and a counter tool,
B) bringing the sonotrode excited with an ultrasonic oscillation into contact with the plastic material during a welding phase and
C) moving the sonotrode and the counter tool toward one another during a holding phase, in which neither the sonotrode nor counter tool are excited with an ultrasonic oscillation so that a force F is applied to the plastic material.

This type of ultrasonic treatment method is generally known. The method produces a material connection between the plastic material parts. The plastic material parts are positioned between the sonotrode and the counter tool. The sonotrode is excited with an ultrasonic oscillation, so that longitudinal oscillations having frequencies of 20 kH, for example, and oscillation amplitudes of 5 μm to 50 μm, for example, are introduced into the plastic material parts by the sonotrode. Depending on the application, heat is produced between the sonotrode and the plastic material or between the touching plastic material parts as a result of friction, as well as within the molecular chains, which causes the material to melt.

Ultrasonic welding is in particular used to join injection moulded parts, rivet different materials together and produce form-locking connections by flanging.

In the welding phase, in which the sonotrode and possibly also the counter tool are excited with an ultrasonic oscillation, the sonotrode and the counter tool are typically moved toward one another, while the plastic material to be treated is disposed between the counter tool and the sonotrode.

Therefore, during the welding phase, an ultrasonic oscillation is applied to the material by the sonotrode and possibly also by the counter tool, while the two elements, the sonotrode and the counter tool, move toward one another.

The force with which the sonotrode presses on the plastic material and/or the path that the sonotrode travels in the direction of the counter tool is controlled in the welding phase. The treatment process and the quality of the welded joint can be influenced by adjusting and varying the process parameters, such as the force on the material, the advancement rate of the sonotrode, or the material temperature.

At the end of the welding phase, the ultrasonic excitation is switched off. The material melted by the ultrasonic treatment will then return to the solid state.

Following the welding phase with a holding phase, in which the sonotrode presses on the material with a constant force F in the direction of the counter tool, is already known. This prevents the material parts from separating from one another again before the material has resolidified.

US 2018/304543 A1, for example, describes a method for mechanically securing a first component comprising thermoplastic material to a second component, wherein the thermoplastic material is melted by introducing vibrations and the associated generation of friction heat, so that a bond is created with the second component when the thermoplastic material is resolidified in a cooling phase following the melting. Similar methods are also known from EP 0 301 831 A2, EP 2 990 182 A2, EP 0 421 019 A1, U.S. Pat. Nos. 3,022,814 A and 4,904,319 A.

However, providing a holding phase prolongs the treatment time during which the sonotrode and the counter tool are in contact with the material. The sonotrode and the counter tool are therefore not available for welding further material parts during the holding phase.

In ultrasonic treatment, it is a constant objective to reduce the treatment times while not compromising, or even improving, the quality of the welding process.

This object is achieved according to the invention by varying the force F during the holding phase in step C) and by controlling or regulating the movement of the sonotrode and the counter tool toward one another in step C). It has been shown that the holding phase does not only have to serve the purpose of waiting for the material to solidify, but that it is also possible to influence the solidification process, and thus the welded joint, during the holding phase in which ultrasonic oscillation is no longer introduced into the material. Varying the force F allows the liquid components to be acted upon in a targeted manner and the solidification process to be controlled.

In most cases, increasing the force F during the holding phase is advantageous. The force applied to the material supports the transition from the liquid phase to the solid phase due to the higher pressure in the material. Relaxation of the polymer chains also supports entanglement, which results in a good connection.

However, as the material solidifies, a higher counterpressure is provided by the material. Increasing the applied force F during the solidification process ensures that, even with increasing solidification, sufficient force is provided on the still liquid components of the material to accelerate and improve the solidification of these areas.

The present invention is the first to focus attention on the holding phase. Surprisingly, varying and in particular increasing the force in the holding phase significantly influences the solidification process and also the quality of the welded joint.

In a preferred embodiment of the invention, step C) includes a regulation of the movement of the sonotrode and the counter tool toward one another.

For example, regulation can be carried out by measuring an ACTUAL pressure with which the sonotrode and the counter tool are moved toward one another, comparing said ACTUAL pressure with a TARGET pressure and changing the movement toward one another as a function of the difference between the ACTUAL pressure and the TARGET pressure. The ACTUAL pressure can be the hydraulic or pneumatic pressure of an advancing means that moves the sonotrode and the counter tool toward one another.

Alternatively, regulation can be carried out by measuring the ACTUAL force F, comparing said ACTUAL force with a TARGET force and changing the movement toward one another as a function of the difference between the ACTUAL force and the TARGET force.

The TARGET force can, for example, be a time-dependent function that increases over time. The force can temporarily also be selected to be lower again. However, it is essential that the force F at a time $t_2$, which is after the time $t_1$, be greater than the force F at the time $t_1$. In a preferred embodiment, a monotonically increasing function is selected as the TARGET force; i.e. the force F is not reduced during the holding phase.

However, it is important to note that, following the holding phase, the sonotrode has to be moved away from the counter tool again in order to remove the welded material parts and position the next material parts to be treated between the sonotrode and the counter tool. This opening phase begins with an abrupt reduction of the force F since the direction of movement of the sonotrode is reversed. The opening phase is not part of the holding phase, but follows it.

In a further preferred embodiment, it is provided that the movement of the sonotrode and the counter tool toward one another is regulated by measuring the ACTUAL distance d of the sonotrode or the counter tool, comparing said ACTUAL distance with a TARGET distance and changing the movement toward one another as a function of the difference between the ACTUAL distance and the TARGET distance.

The ACTUAL distance can be measured either directly or indirectly, for example by measuring the position of the sonotrode, from which the distance to the stationary counter tool can be derived. It is not necessary to calculate the distance. Since the ACTUAL distance d differs from the position of the sonotrode only by a subtrahend, it is sufficient to measure the position of the sonotrode and compare it with a TARGET position of the sonotrode.

The TARGET distance can be a function that decreases monotonically over time, for example.

In another particularly preferred embodiment, a function the derivative of which is constant after time is selected as the TARGET distance.

This ensures that the distance decreases at a constant rate.

The movement toward one another can be changed as a function of the difference between the ACTUAL distance and the TARGET distance by varying the force with which the sonotrode and the counter tool press on the material to be treated.

Further advantages, features, and possible applications of the present invention will become apparent from the following description of a preferred embodiment and the associated FIGURE. The FIGURE shows:

FIG. 1 a flow diagram of the method according to the invention.

The ultrasonic treatment method according to the invention consists of two phases, the welding phase 1 and the holding phase 2. During the welding phase, the material to be treated is brought into contact with a sonotrode oscillating with high frequency.

In particular when the material consists of different material parts, high-frequency friction effects which lead locally to material heating occur at the contact surface between the material parts, so that the polymer material melts. As soon as sufficient melting has occurred, the welding phase is ended; i.e. the ultrasonic excitation of the sonotrode and possibly also the counter tool is ended.

In principle, the workpiece can now be removed from the ultrasonic welding system. However, the polymer material still exhibits a high degree of mobility at the melted portions, so that the material parts could potentially separate again. It is therefore necessary to wait until the polymer melt has resolidified. In this so-called holding phase 2, a force is exerted by the sonotrode on the material to be treated.

During the holding phase, the liquid components of the polymer material solidify. However, this does not take place uniformly over all of the liquid components, but gradually in sections. The solidification process can be accelerated by steadily increasing the force applied to the material by the sonotrode in the holding phase 2.

With increasing solidification of the liquid portions, the resistance offered to the sonotrode by the material increases. Therefore, to further accelerate the solidification process and bring about better entanglement within the polymer chains, according to the invention the force is not kept constant in the holding phase, but is instead varied, and specifically preferably increased.

In the particularly preferred embodiment, this is accomplished by measuring the relative position between the sonotrode and the counter tool and reducing the distance between the sonotrode and the counter tool at a constant rate. At the end of the holding phase, substantially all of the polymer regions liquefied by the ultrasonic treatment have resolidified, so that the sonotrode and the anvil can be moved away from one another again to remove the material and place the next piece of material to be treated between the sonotrode on the one hand and the counter tool on the other.

REFERENCE SIGNS

1 Welding phase
2 Holding phase

The invention claimed is:

1. Method for ultrasonic treatment of a plastic material comprising the steps:
   A) positioning the plastic material between a sonotrode and a counter tool,
   B) bringing the sonotrode excited with an ultrasonic oscillation into contact with the plastic material during a welding phase,
   C) moving the sonotrode and the counter tool toward one another during a holding phase, in which neither the sonotrode nor counter tool are excited with an ultrasonic oscillation so that a force F is applied to the plastic material, wherein the force F is varied during the holding phase in step C)
   characterised in that
   the movement of the sonotrode and the counter tool toward one another is controlled or regulated in step C).

2. Method according to claim 1, characterised in that the force is increased during the holding phase in step C).

3. Method according to claim 1, characterised in that the movement of the sonotrode and the counter tool toward one another is regulated in step C).

4. Method according to claim 1, characterised in that the movement of the sonotrode and the counter tool toward one another is regulated in step C) by measuring an ACTUAL pressure with which the sonotrode and the counter tool are moved toward one another, comparing said ACTUAL pressure with a TARGET pressure and changing the movement toward one another as a function of the difference between the ACTUAL pressure and the TARGET pressure.

5. Method according to claim 1, characterised in that the movement of the sonotrode and the counter tool toward one another is regulated in step C) by measuring an ACTUAL force F, comparing said ACTUAL force with a TARGET force and changing the movement toward one another as a function of the difference between the ACTUAL force and the TARGET force.

6. Method according to claim 1, characterised in that the movement of the sonotrode and the counter tool toward one another is regulated in step C) by measuring an ACTUAL distance d of the sonotrode or the counter tool, comparing said ACTUAL distance with a TARGET distance and changing the movement toward one another as a function of the difference between the ACTUAL distance and the TARGET distance.

7. Method according to claim 6, characterised in that a function which decreases monotonically over time is selected as the TARGET distance.

8. Method according to claim 7, characterised in that a function the derivative of which is constant over time is selected as the TARGET distance.

9. Method according to claim 2, characterised in that the movement of the sonotrode and the counter tool toward one another is regulated in step C).

\* \* \* \* \*